United States Patent Office 2,865,914
Patented Dec. 23, 1958

2,865,914

3 KETALS AND 3 ENOL ETHERS OF 2-CHLORO 11β,21 - DIHYDROXY 4,17/20-[CIS] PREGNADIENE-3-ONE AND 21-ACYL ESTERS THEREOF

William P. Schneider, Alan H. Nathan, and John A. Hogg, Kalamazoo Township, Kalamazoo County, Mich., assignors to The Upjohn Company, Kalamazoo, Mich., a corporation of Michigan No Drawing. Application May 23, 1955
Serial No. 510,517

5 Claims. (Cl. 260—239.55)

This invention relates to novel 2-halogenated steroids and especially 2 - chloro - 11β,17α,21 - trihydroxy-4-pregnene-3,20-dione and 21-esters thereof, to novel steroid intermediates in the production of these compounds and to a process for their production.

The novel compounds of the present invention and the process for their production may be represented by the following formulae:

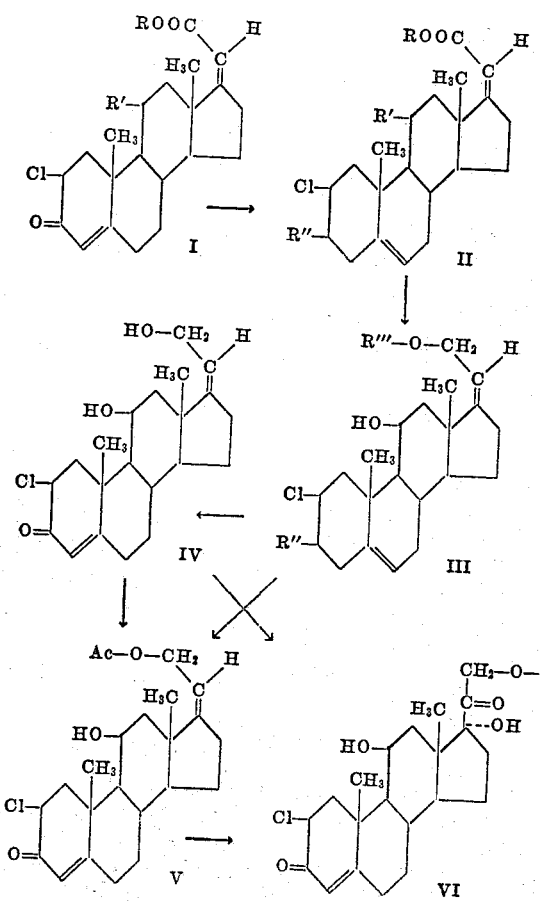

wherein R is hydrogen or lower-alkyl, R' is β-hydroxy or keto, R" is a ketone protecting group, e. g., a ketal or enol ether, Ac is the acyl radical of an organic carboxylic acid and R'" is hydrogen or Ac as defined above.

Protecting the 3-keto group of a 2-chloro-3-keto-11-oxygenated-4,17(20)-[cis]-pregnadiene - 21 - carbonyloxy steroid (I) with a ketone protecting group, e. g., an enol ether or ketal group according to methods known in the art, e. g., reaction of I with ethylene glycol, propylene glycol, trimethylene glycol, methyl alcohol, ethyl alcohol, benzyl alcohol, etc., in the presence of an acidic catalyst, is productive of II. Reduction of II with lithium aluminum hydride, sodium aluminum hydride or equivalent chemical reducing agent capable of reducing a carboxylic group to a carbinol is productive of a 3 - ketone - protected 2 - chloro - 11β,21 - dihydroxy-4,17(20) - [cis] - pregnadiene - 3 - one (III). Hydrolysis of the 3-ketone protecting group with aqueous acid is productive of 2-chloro-11β,21-dihydroxy-4,17(20)-[cis]-pregnadiene-3-one (IV). Acylation of the 21-hydroxy group prior to hydrolysis of the 3-ketone protecting group is productive of a 3-ketone-protected 2-chloro-11β-hydroxy - 21-acyloxy-4,17(20)-[cis]-pregnadiene-3-one (III, R''' is Ac), which can be selectively hydrolyzed to produce 2 - chloro - 11β - hydroxy-21-acyloxy-4,17(20)-[cis]-pregnadiene-3-one (V). Oxidative hydroxylation of IV or a 21-ester thereof (V) with, for example, osmium tetroxide and hydrogen peroxide, is productive of 2-chloro-11β,17α,21-trihydroxy-4-pregnene-3,20-dione (VI, R''' is H) and 21 esters thereof (VI, R''' is Ac), respectively.

A 2 - chloro-3-keto-11-oxygenated-4,17(20)-[cis]-pregnadiene-21-carbonyloxy steroid (I) is prepared as described in the copending application of Hogg, Beal, Nathan and Lincoln, S. N. 346,274, filed April 1, 1953, now Patent No. 2,790,814 e. g., by reacting 11-ketoprogesterone with about two molar equivalents of sodium methoxide and about two to ten molar equivalents of diethyl oxalate in tertiary butyl alcohol, followed by chlorination with about three molar equivalents of chlorine and then by rearrangement with a small excess of sodium methoxide and methanol to produce methyl 2-chloro-3,11-diketo-4,17(20)-[cis]-pregnadiene-21-oate (I; R is methyl, R' is keto). Hydrolysis of this compound with sodium methoxide, in the reaction described above is productive of the free acid (I; R is H, R' is keto). Substituting 11β-hydroxyprogesterone for the 11-ketoprogesterone as the starting steroid in the reactions described above is productive of the corresponding 11β-hydroxy steroids. Substituting another lower-alkanol and alkali-metal lower-alkoxide for the sodium methoxide and methanol employed above, e. g., sodium ethoxide and ethanol, is productive of other lower-alkyl esters of 2-chloro-3,11-diketo-4,17(20)-[cis]-pregnadiene-21-oic acid and 2-chloro-3-keto-11β-hydroxy-4,17(20)-[cis]-pregnadiene-21-oic acid which can also be prepared by esterification of the free acid, according to methods known in the art.

Substituting fluorine or iodoheptafluoride for the chlorine employed above is productive of the corresponding 2-fluoro compound. Alternatively, the 2-chloro compounds (I to VI) can be reacted with a metal fluoride under exchange reaction conditions to produce the corresponding fluoro compounds. These fluoro compounds are converted to 2-fluorohydrocortisone and 21-esters thereof in the same manner as the corresponding 2-chloro compounds. Reacting 2 - chloro-11β,21-dihydroxy-4,17(20)-pregnadiene-3-one (IV) or 21-ester thereof (V) with sodium iodide in acetone is productive of the corresponding 2-iodo compound which is converted to 2-iodohydrocortisone and 21-esters thereof in the same manner as the corresponding 2-chloro compounds. The 2-chloro compounds (IV to VI) are similarly converted to the 2-bromo compounds which produce 2-bromohydrocortisone and 21-esters thereof.

Oxidation of the 2-chloro-, 2-fluoro-, 2-bromo- or 2-iodo-Compound VI, with N-bromoacetamide in tertiary butyl alcohol is productive of the corresponding 11-keto compounds, i. e., 2-halocortisone and 21-esters thereof which also possess adrenal cortical hormone activity.

The 2-halogenated cortical hormones, i. e., 2-halohydrocortisone, 2-halocortisone, and 21-esters thereof, have adrenal cortical hormone activity. The 2-chloro hydrocortisone and its 21-esters (VI), e. g., the acetate, have the adrenal cortical activity of the corresponding hydrocortisone and its 21-esters and are efficacious in the treatment of inflammatory ailments and are employable as an improved alternative for the natural hormone in the treatment of maladies in both humans and valuable domestic animals, e. g., in inflammations of the skin and eyes caused by bacterial or fungal infections, contact dermatitis or other physiological maladjustment.

The 2-halogenated cortical hormones of the present invention, particularly the 2-chlorohydrocortisone and 21-esters thereof, are especially useful in pharmaceutical compositions and mixtures, e. g., ointments, lotions, greases, creams, aqueous suspensions, etc., for topical use. Incorporation of an antibiotic, especially neomycin sulfate, in an ointment, has surprising therapeutic advantages with each active ingredient potentiating and supplementing the useful properties of the other.

The following preparations and examples are illustrative of the products of the present invention and a process for their production, but are not to be construed as limiting.

PREPARATION 1

Methyl 2-chloro-3,11-diketo-4,17(20)-[cis]-pregnadiene-21-oate

A solution of 6.57 grams (0.02 mole) of 11-ketoprogesterone in 100 milliliters of tertiary butyl alcohol was prepared at seventy degrees centigrade in an atmosphere of nitrogen. When the temperature of the solution dropped to 55 degrees centigrade, there was added with stirring 11.7 grams (0.08 mole) of ethyl oxalate and 2.70 grams of sodium methoxide (0.05 mole) as a 25 percent solution in methanol, all in an atmosphere of nitrogen. Stirring was continued for about fifteen minutes while permitting the temperature to drop to about 37 degrees centigrade. A solution of 1.70 grams of glacial acetic acid and 2.46 grams of sodium acetate in 160 milliliters of methanol, cooled to ten degrees centigrade, was then added. The resulting dark green solution was cooled to about zero degrees centigrade and chlorine gas was added until the solution turned cloudy and white and a positive test for halogen on moistened starch-potassium iodide paper was obtained. The mixture was stirred for five minutes and, if a negative test for halogen was obtained, more chlorine was added until a positive test was obtained. This procedure was repeated until a persistent positive test for halogen was obtained. It was important, however, not to add more than just enough chlorine to give a positive test. The temperature of the reaction mixture was maintained at between zero and five degrees centigrade during the chlorination which took about forty minutes.

To the resulting halogenated mixture was added 4.536 grams of sodium methoxide as a 25 percent solution in methanol. The temperature of the reaction mixture was permitted to rise to about 25 degrees centigrade. The mixture was maintained at this temperature for two hours and then poured into 1.7 liters of a mixture of ice and water. The resulting steroidal precipitate was filtered, washed thoroughly with water, filtered and dried. The dried crude product weighed 7.67 grams and melted at 100 to 120 degrees centigrade.

The precipitate was dissolved in benzene and poured over a column of thirty grams of Florisil synthetic magnesium silicate. The column was washed with a total volume of 390 milliliters of benzene and then developed with 130 milliliters of Skellysolve B hexane hydrocarbons plus ten percent acetone. The eluate fractions containing the bulk of the crystalline material were combined to give 3.51 grams of methyl 2-chloro-3,11-diketo-4,17(20)-pregnadiene-21-oate melting at about 185 to 189 degrees centigrade. Recrystallization of these crystals from ethyl acetate gave colorless prisms melting at 192 to 193 degrees centigrade, having an $[\alpha]_D$ of plus 214 degrees in chloroform and the analysis below.

Calculated for $C_{22}H_{27}ClO_4$: C, 67.59; H, 6.96; Cl, 9.07. Found: C, 67.94; H, 6.84; Cl, 8.46.

PREPARATION 2

The 3-ethylene glycol ketal of methyl 2-chloro-3,11-diketo-4,17(20)-[cis]-pregnadiene-21-oate A solution of 3.71 grams of methyl 2-chloro-3,11-diketo-4,17(20)-[cis]-pregnadiene-21-oate and 0.360 gram of paratoluenesulfonic acid dissolved in a mixture of 180 milliliters of benzene and ten milliliters of ethylene glycol was refluxed for eight hours with continual removal of the water reaction by a water trap. The cooled benzene solution was shaken with aqueous sodium bicarbonate, dried and then poured over a chromatographic column of 220 grams of Florisil magnesium silicate. The column was developed with nine 300-milliliter portions of Skellysolve B plus four percent acetone and six 300-milliliter portions of Skellysolve B plus eight percent acetone. The sixth through twelfth 300-milliliter eluate fractions contained 3.37 grams of the 3-ethylene glycol ketal of methyl 2-chloro-3,11-diketo-4,17(20)-[cis]-pregnadiene-21-oate whose melting point varied from about 147 to about 203 degrees centigrade with no apparent difference in purity. The infrared absorption spectrum of this product was consistent with the structure. The product had an $E_{223}$ of 11,225 and the analysis below.

Calculated for $C_{24}H_{31}ClO_5$: C, 66.27; H, 7.18; Cl, 8.15. Found: C, 66.38; H, 7.35; Cl. 7.63.

PREPARATION 3

The 3-benzyl enol ether of methyl 2-chloro-3,11-diketo-4,17(20)-[cis]-pregnadiene-21-oate Following the procedure of Preparation 2, substituting benzyl alcohol for the ethylene glycol, there is thus produced the 3-benzyl enol ether of methyl 2-chloro-3,11-diketo-4,17(20)-[cis]-pregnadiene-21-oate.

EXAMPLE 1

The 3-ethylene glycol ketal of 2-chloro-11β,21-dihydroxy-4,17(20)-[cis]-pregnadiene-3-one To a solution of 0.5 gram of lithium aluminum hydride in 75 milliliters of ether was added a solution of 1.71 grams of the 3-ethylene glycol ketal of methyl 2-chloro-3,11-diketo-4,17(20)-[cis]-pregnadiene-21-oate in thirty milliliters of benzene. The mixture was stirred for one hour and then decomposed by the addition of 2.4 milliliters of ethyl acetate followed by one milliliter of water. The ether layer was decanted and washed thoroughly with water. The dried ether solution was evaporated to dryness to give 1.477 grams of the 3-ethylene glycol ketal of 2-chloro-11β,21-dihydroxy-4,17(20)-[cis]-pregnadiene-3-one melting at 156 degrees centigrade with decomposition. Recrystallization of these crystals from ethyl acetate gave product melting at 156.5 to 157.5 degrees centigrade with decomposition and having the analysis below.

Calculated for $C_{23}H_{33}ClO_4$: Cl, 8.67. Found: Cl, 8.14, 8.81.

EXAMPLE 2

The 3-benzyl enol ether of 2-chloro-11β,21-dihydroxy-4,17(20)-[cis]-pregnadiene-3-one Following the procedure described in Example 1, but substituting the 3-benzyl enol ether of methyl 2-chloro-3,11-diketo-4,17(20)-[cis]-pregnadiene-21-oate as the starting steroid, there is thus produced the 3-benzyl enol ether of 2-chloro-11β,21-dihydroxy-4,17(20)-[cis]-pregnadiene-3-one.

EXAMPLE 3

The 3-ethylene glycol ketal of 2-chloro-11β-hydroxy-21-acetoxy-4,17(20)-[cis]-pregnadiene-3-one A solution of 243 milligrams of the 3-ethylene glycol ketal of 2-chloro-11β,21-dihydroxy-4,17(20)-[cis]-pregnadiene-3-one in 1.62 milliliters of pyridine and 2.43 milliliters of acetic anhydride was maintained at room temperature for four hours. The solution was poured into water to give a white gum which crystallized upon trituration with a ten percent aqueous solution of hydrochloric acid. The crystals, upon drying, weighed 255 milligrams and melted at 130 to 134 degrees centigrade. Recrystallization of these crystals from a mixture of acetone and Skellysolve B hexane hydrocarbons gave the 3-ethylene glycol ketal of 2-chloro-11β-hydroxy-21-acetoxy-4,17(20)-[cis]-pregnadiene-3-one melting at 143 to 144 degrees centigrade and having the analysis below.

Calculated for $C_{25}H_{35}ClO_5$: Cl, 7.86; Acetyl, 9.54. Found: Cl, 7.90; Acetyl, 9.1.

EXAMPLE 4

*The 3-benzyl enol ether of 2-chloro-11β-hydroxy-21-acetoxy-4,17(20)-[cis]-pregnadiene-3-one*

Following the procedure of Example 3, but substituting the 3-benzyl enol ether of 2-chloro-11β,21-dihydroxy-4,17(20)-[cis]-pregnadiene-3-one as the starting steroid, there is thus produced the 3-benzyl enol ether of 2-chloro-11β - hydroxy - 21 - acetoxy - 4,17(20) - [cis] - pregnadiene-3-one.

EXAMPLE 5

*2-chloro-11β-hydroxy-21-acetoxy-4,17(20)-[cis]-pregnadiene-3-one*

To a solution of 575 milligrams of crude 3-ethylene glycol ketal of 2-chloro-11β-hydroxy-21-acetoxy-4,17(20)-[cis]-pregnadiene-3-one in 4.6 milliliters of methanol was mixed with 0.05 milliliter of 5 N hydrochloric acid at room temperature for three hours. The solution was then cooled to minus fifteen degrees centigrade. There was precipitated from the chilled solution 226 milligrams of 2 - chloro - 11β - hydroxy - 21 - acetoxy - 4,17(20) - [cis] - pregnadiene-3-one melting at 149 to 153 degrees centigrade. Recrystallization of this product from a small amount of ethyl acetate plus a large volume of Skellysolve B raised the melting point to 156 to 159 degrees centigrade. A second recrystallization gave 2-chloro-11β-hydroxy - 21 - acetoxy - 4,17(20) - [cis] - pregnadiene-3-one melting at 169.5 to 171 degrees centigrade, having an $E_{244}$ of 17,200, and the analysis below.

Calculated for $C_{23}H_{31}ClO_4$: C, 67.88; H, 7.68; Cl, 8.71. Found: C, 66.42; H, 7.56; Cl, 7.56.

EXAMPLE 6

*2-chloro-11β,21-dihydroxy-4,17(20)-[cis]-pregnadiene-3-one*

Following the procedure described in Example 5, 2-chloro - 11β,21 - dihydroxy - 4,17(20) - [cis] - pregnadiene-3-one is produced by the hydrolysis of the 3-ethylene glycol ketal of 2-chloro-11β,21-dihydroxy-4,17-(20)-[cis]-pregnadiene-3-one or the 3-benzyl enol ether of 2 - chloro - 11β,21 - dihydroxy - 4,17(20) - pregnadiene-3-one.

EXAMPLE 7

*2-chloro-11β-hydroxy-21-acetoxy-4,17(20)-[cis]-pregnadiene-3-one*

A solution of 122 milligrams of 2-chloro-11β-21-dihydroxy-4,17(20)-[cis]-pregnadiene-3-one was dissolved in a mixture of 1.5 milliliters of acetic anhydride and 2.25 milliliters of dry pyridine. The mixture was maintained at about 25 degrees centigrade for about sixteen hours. The excess acetic anhydride was then decomposed with ice water and the resulting gummy precipitate was extracted with benzene. The benzene solution was washed with cold dilute hydrochloric acid, cold aqueous sodium bicarbonate and finally with water and then dried. The dried benzene solution was distilled to dryness. The residue consisted of essentially pure, crystalline 2-chloro-11β-hydroxy-21-acetoxy-4,17(20)-[cis]-pregnadiene-3-one. Recrystallization of this product from a mixture of ethyl acetate and Skellysolve B gave 2-chloro-11β-hydroxy-21-acetoxy-4,17(20)-[cis]-pregnadiene-3-one melting at 169 to 171 degrees centigrade.

Similarly, 2-chloro-11β,21-dihydroxy-4,17(20)-[cis]-pregnadiene-3-one is converted to other 2-chloro-11β-hydroxy-21-acyloxy-4,17(20)-[cis]-pregnadiene-3-ones by esterification of the 21-hydroxy group, e. g., by reaction with the appropriate acid anhydride, in the presence of a basic catalyst such as pyridine or sodium acetate. Examples of 2-chloro-11β-hydroxy-21-acyloxy-4,17(20)-[cis]-pregnadiene-3-one which can be prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e. g., cyclopropylideneacetic, cyclopentylformic, cyclopentylacetic, β-cyclopentylpropionic, cyclohexylformic, cyclohexylacetic, β-cyclohexylpropionic, cyclohexyl- or alkaryl acid, e. g., benzoic, 2, 3 or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, etc.

EXAMPLE 8

*2-chloro-11β,17α-dihydroxy-21-acetoxy-4-pregnene-3,20-dione*

To a solution of 267 milligrams of 2-chloro-11β-hydroxy - 21 - acetoxy - 4,17(20) - [cis] - pregnadiene - 3-one dissolved in thirteen milliliters of tertiary butyl alcohol was added 0.127 milliliter of pyridine followed by a solution of 245 milligrams of N-methyl-morpholine oxide peroxide in one milliliter of tertiary butyl alcohol and 2.4 milligrams of $OsO_4$ in 0.5 milliliter of tertiary butyl alcohol. The N-methylmorpholine oxide peroxide is prepared by the reaction of N-methylmorpholine with two molar equivalents of anhydrous hydrogen peroxide in tertiary butyl alcohol. The mixture was maintained at about 25 degrees centigrade for eighteen hours and then mixed with 0.5 milliliter of a 0.5 N aqueous solution of $Na_2S_2O_4$ and some Magnesol filter aid. The solution was filtered and most of the tertiary butyl alcohol distilled from the filtrate at reduced pressure and at room temperature. The concentrate was diluted with ten milliliters of water added portionwise. The steroidal precipitate was filtered and dried to give 2-chloro-11β,17α-dihydroxy-21-acetoxy-4-pregnene-3,20-dione melting at 175 to 178 degrees centigrade.

Following the procedure described above, other 21-esters of 2-chloro-11β,21-dihydroxy-4,17(20)-[cis]-pregnadiene-3-one, e. g., the esters described in the paragraph following Example 7, are converted to the corresponding 21-esters of 2-chlorohydrocortisone. Similarly, 2-chloro-11β,21 - dihydroxy - 4,17,(20) - [cis] - pregnadiene - 3-one is converted to 2-chlorohydrocortisone.

EXAMPLE 9

*2-chloro-11β,17α,21-trihydroxy-4-pregnene-3,20-dione*

A solution of 438 milligrams of 2-chlorohydrocortisone acetate in four milliliters of methanol is freed of oxygen by bubbling nitrogen therethrough. A solution of 404 milligrams of potassium bicarbonate in four milliliters of water is similarly freed of oxygen. The two solutions are mixed at a temperature of between eighteen and twenty degrees centigrade and in a nitrogen atmosphere. The mixture is stirred at room temperature for five hours while protecting it from atmospheric oxygen with nitrogen. At the end of this time the solution is neutralized with glacial acetic acid. The neutral solution is concentrated by distillation at room temperature and reduced pressure and then chilled in a refrigerator for sixteen hours. The precipitated 2-chlorohydrocortisone is filtered and dried.

2-fluoro- and 2-chlorohydrocortisone can also be prepared by substituting the corresponding 2-halo-11β,21-dihydroxy-4,17(20)-[cis]-pregnadiene-3-one for the 21-acetate employed in the oxidative hydroxylation reaction.

It is to be understood that the invention is not to be limited to the exact details of operation or exact compounds shown and described, as obvious modifications

We claim:
1. A compound selected from the group consisting of 3-enol ethers of (1) 2-chloro-11β,21-dihydroxy-4,17(20)-[cis]-pregnadiene-3-one and 21-acyl esters thereof represented by the following formula:

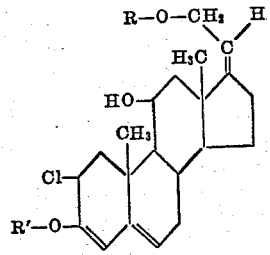

wherein R is selected from the group consisting of hydrogen and the acyl radical of a hydrocarbon carboxylic acid containing from one to twelve carbon atoms, inclusive, and wherein R' is a hydrocarbon radical containing from one to eight carbon atoms, inclusive, (2) 3-cyclic ketals thereof represented by the following formula:

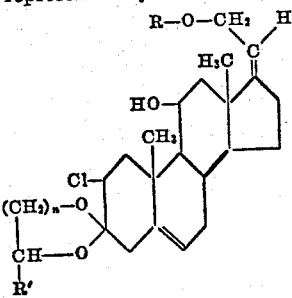

wherein n is a whole number from one to two, inclusive, and wherein R is selected from the group consisting of hydrogen and the acyl radical of a hydrocarbon carboxylic acid containing from one to twelve carbon atoms, inclusive, and wherein R' is selected from the group consisting of hydrogen and hydrocarbon radicals containing from one to eight carbon atoms, inclusive.

2. The 3-ethylene glycol ketal of 2-chloro-11β,21-dihydroxy-4,17(20)-[cis]-pregnadiene-3-one.

3. The 3-benzyl enol ether of 2-chloro-11β,21-dihydroxy-4,17(20)-[cis]-pregnadiene-3-one.

4. The 3-ethylene glycol ketal of 2-chloro-11β-hydroxy-21-acetoxy-4,17(20)-[cis]-pregnadiene-3-one.

5. The 3-benzyl enol ether of 2-chloro-11β-hydroxy-21-acetoxy-4,17(20)-[cis]-pregnadiene-3-one.

References Cited in the file of this patent
UNITED STATES PATENTS

| | | |
|---|---|---|
| 2,681,353 | Archer | June 15, 1954 |
| 2,684,364 | Jones | July 20, 1954 |
| 2,707,184 | Hogg et al. | Apr. 26, 1955 |
| 2,748,150 | Bergstrom | May 29, 1956 |
| 2,774,775 | Korman et al. | Dec. 18, 1956 |
| 2,790,814 | Hogg et al. | Apr. 30, 1957 |

OTHER REFERENCES

Experientia, vol. XII, #9, pages 325–326 (1956).
J. A. C. S. 76, page 1455 (1945).